(12) United States Patent
Honda et al.

(10) Patent No.: US 8,256,238 B2
(45) Date of Patent: Sep. 4, 2012

(54) CONTROL SYSTEM FOR A VARIABLE-CAPACITY COMPRESSOR IN AIR CONDITIONER

(75) Inventors: Katsuhiko Honda, Chiryu (JP); Takeshi Wakisaka, Ichinomiya (JP)

(73) Assignee: Denso Corporation, Kariya (JP)

( * ) Notice: Subject to any disclaimer, the term of this patent is extended or adjusted under 35 U.S.C. 154(b) by 564 days.

(21) Appl. No.: 11/810,259

(22) Filed: Jun. 5, 2007

(65) Prior Publication Data
US 2007/0277544 A1 Dec. 6, 2007

(30) Foreign Application Priority Data

Jun. 6, 2006 (JP) ................................. 2006-157833
May 16, 2007 (JP) ................................. 2007-131004

(51) Int. Cl.
*F25B 1/00* (2006.01)
*F25B 49/00* (2006.01)
(52) U.S. Cl. .............. 62/228.3; 62/226; 62/227; 62/229
(58) Field of Classification Search .................. 62/226, 62/227, 228.3, 229
See application file for complete search history.

(56) References Cited

U.S. PATENT DOCUMENTS

| | | | | |
|---|---|---|---|---|
| 4,646,535 A | * | 3/1987 | Matsuoka et al. | 62/228.5 |
| 4,829,777 A | * | 5/1989 | Matsuoka et al. | 62/212 |
| 5,775,415 A | * | 7/1998 | Yoshimi et al. | 165/202 |
| 6,389,824 B2 | * | 5/2002 | Ota et al. | 62/115 |
| 6,453,685 B2 | * | 9/2002 | Ota et al. | 62/115 |
| 6,588,222 B1 | * | 7/2003 | Urbank et al. | 62/127 |
| 6,622,500 B1 | * | 9/2003 | Archibald et al. | 62/173 |
| 7,172,018 B2 | * | 2/2007 | Katou et al. | 165/204 |
| 2004/0129009 A1 | * | 7/2004 | Umemura et al. | 62/226 |

FOREIGN PATENT DOCUMENTS

| | | |
|---|---|---|
| JP | 1-119413 | 5/1989 |
| JP | 05-085142 | 4/1993 |
| JP | 2003-136935 | 5/2003 |

OTHER PUBLICATIONS

Office action dated Oct. 4, 2011 in corresponding Japanese Application No. 2007-131004.

* cited by examiner

*Primary Examiner* — Cheryl J Tyler
*Assistant Examiner* — Paolo Gonzalez
(74) *Attorney, Agent, or Firm* — Harness, Dickey & Pierce, PLC

(57) ABSTRACT

An air conditioning system for a vehicle has a refrigerant cycle device which has an evaporator and a compressor and in which refrigerant is discharged from the compressor to be evaporated in the evaporator so that air passing the evaporator is cooled to be blown into a passenger compartment of the vehicle. The control unit drives the compressor at a control value which is determined based on at least one of a pressure of the refrigerant in the refrigerant cycle device and an outside-air temperature outside the passenger compartment, when the control unit actuates the compressor.

23 Claims, 8 Drawing Sheets

CONTROL SYSTEM FOR A VARIABLE-CAPACITY COMPRESSOR IN AIR CONDITIONER

CROSS REFERENCE TO RELATED APPLICATION

This application is based on a Japanese Patent Application No. 2006-157833 filed on Jun. 6, 2006 and a Japanese Patent Application No. 2007-131004 filed on May 16, 2007, the disclosures of which are incorporated herein by reference.

FIELD OF THE INVENTION

The present invention relates to an air conditioning system. The air conditioning system can be suitably used for a vehicle, for example.

BACKGROUND OF THE INVENTION

Generally, with reference to JP-5-85142A, an air conditioning system for a vehicle performs a PID control based on an actual value of an air temperature of a downstream side with respect to an evaporator at an outlet portion of the evaporator of a refrigerant cycle and a target value of the air temperature. In the air conditioning system, the capacity of the compressor is adjustable according to a calculated control value.

Figure 11:
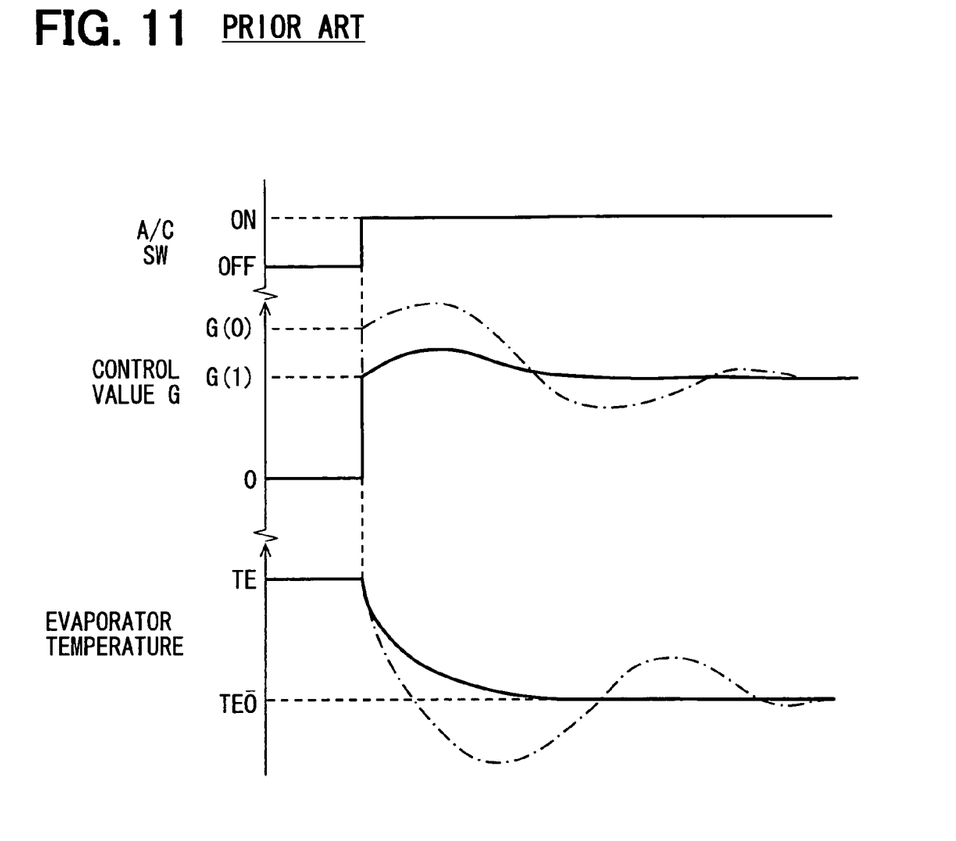
FIG. 11 is a time chart showing a comparison between the present disclosure and a prior art, with a control value and an evaporator temperature varying after startup of a compressor.

However, as shown in FIG. 11, of the present application, in the PID control of the air conditioning system disclosed in JP-5-85142A, when an air conditioner switch becomes ON, a control signal of a predetermined control value G(0) is sent to the compressor so that the compressor is driven at a predetermined output.

The control value G(0) (referring to alternate long and short dashed line in FIG. 11) is the control signal for taking seriously the cooling capability which is necessary in summer or the like. Therefore, with the air conditioner switch being ON, the evaporator temperature will become low (referring to FIG. 11). In this case, when the heat load is a low, the refrigerant flow amount in the refrigerant cycle will become excessively much. Thus, the evaporator temperature will be lower than a target value TEO.

That is, in the case where the temperature in the passenger compartment of the vehicle is high in the summer or the like, the difference between the actual value of the air temperature of the downstream side of the evaporator at the startup of air conditioning and the target value TEO is large, and the capability of the compressor is greatly changed. Therefore, the air temperature of the downstream side of the evaporator will overshoot the target value TEO, with reference to FIG. 11.

In this case, the temperature of the evaporator may become excessively low so that the evaporator freezes. Therefore, bad smell adhered to the evaporator will be liberated to be blown into the passenger compartment along with air-conditioning air, thus discomforting passengers.

SUMMARY OF THE INVENTION

In view of the above-described disadvantage, it is an object of the present invention to provide an air conditioning system in which an evaporator is restricted from freezing while a cooling capability is maintained.

According to a first aspect of the present invention, an air conditioning system for a vehicle has a refrigerant cycle device which has an evaporator and a compressor and in which refrigerant is discharged from the compressor to be evaporated in the evaporator so that air passing the evaporator is cooled to be blown into a passenger compartment of the vehicle, and a control unit which calculates a control value for determining a driving output of the compressor to control an operation of the compressor. The control unit drives the compressor by the control value which is determined based on a pressure of the refrigerant in the refrigerant cycle device, when the control unit actuates the compressor.

In this case, when the compressor is actuated, the control unit determines the control value of the compressor based on the pressure in the refrigerant cycle device to control the driving output. Therefore, the operation at an excessive control value with respect to the heat load exerted on the evaporator at the startup can be restricted. Thus, the overshoot of the air temperature of the downstream side of the evaporator due to overcooling of the evaporator can be reduced, and the freeze of the evaporator can be reduced. Moreover, unpleasant smell leaking into the passenger compartment can be reduced, because of the reduction of the freeze.

Preferably, the control unit determines the control value based on the pressure of the refrigerant in the refrigerant cycle device and an outside-air temperature outside the passenger compartment.

Because the pressure balance point of the refrigerant varies in response to the outside air temperature, the heat load exerted on the evaporator at the startup can be substantially detected. Thus, the freeze of the evaporator can be substantially restricted.

According to a second aspect of the present invention, an air conditioning system for a vehicle has a refrigerant cycle device which has an evaporator and a compressor and in which refrigerant is discharged from the compressor to be evaporated in the evaporator so that air passing the evaporator is cooled to be blown into a passenger compartment of the vehicle, and a control unit which calculates a control value for determining a driving output of the compressor to control an operation of the compressor. The control unit drives the compressor by the control value which is determined based on an outside air temperature outside a passenger compartment of the vehicle, when the control unit actuates the compressor.

In this case, when the compressor is actuated, the control unit determines the control value of the compressor based on the outside air temperature outside the passenger compartment to control the driving output. Therefore, the operation at an excessive control value with respect to the heat load exerted on the evaporator at the startup can be restricted. Thus, the overshoot of the air temperature of the downstream side of the evaporator due to overcooling of the evaporator can be reduced, and the freeze of the evaporator can be reduced.

According to a third aspect of the present invention, a refrigerant cycle device which has an evaporator and a compressor and in which refrigerant is discharged from the compressor to be evaporated in the evaporator so that air passing the evaporator is cooled to be blown into a passenger compartment of the vehicle, and a control unit which calculates a control value for determining a driving output of the compressor to control an operation of the compressor. The control unit drives the compressor by the control value which is determined based on at least one of a pressure of refrigerant in the refrigerant cycle device and an outside air temperature outside the passenger compartment, when a control value setting condition for setting the driving output of the compressor is detected after a startup of the compressor.

In this case, when the control value setting condition for setting the driving output of the compressor is detected after the startup of the compressor, the control value is determined based on at least one of the pressure of refrigerant in the refrigerant cycle device and the outside air temperature. Therefore, the operation at an excessive control value with respect to the heat load exerted on the evaporator at the startup can be restricted. Thus, the freeze of the evaporator can be reduced, and the capability of the compressor can be efficiently provided without being excessively lowered.

Preferably, the control value setting condition is that a predetermined period of time has elapsed since the control unit starts the control for determining the control value to actuate the compressor.

Thus, the control for dealing with the control delay (time lag) at the startup of the compressor, or the control for determining the state where the possibility of freezing is low in response to the time can be performed.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

First Embodiment

An air conditioning system for a vehicle according to a first embodiment of the present invention will be described with reference to FIGS. 1-7.

Figure 1:
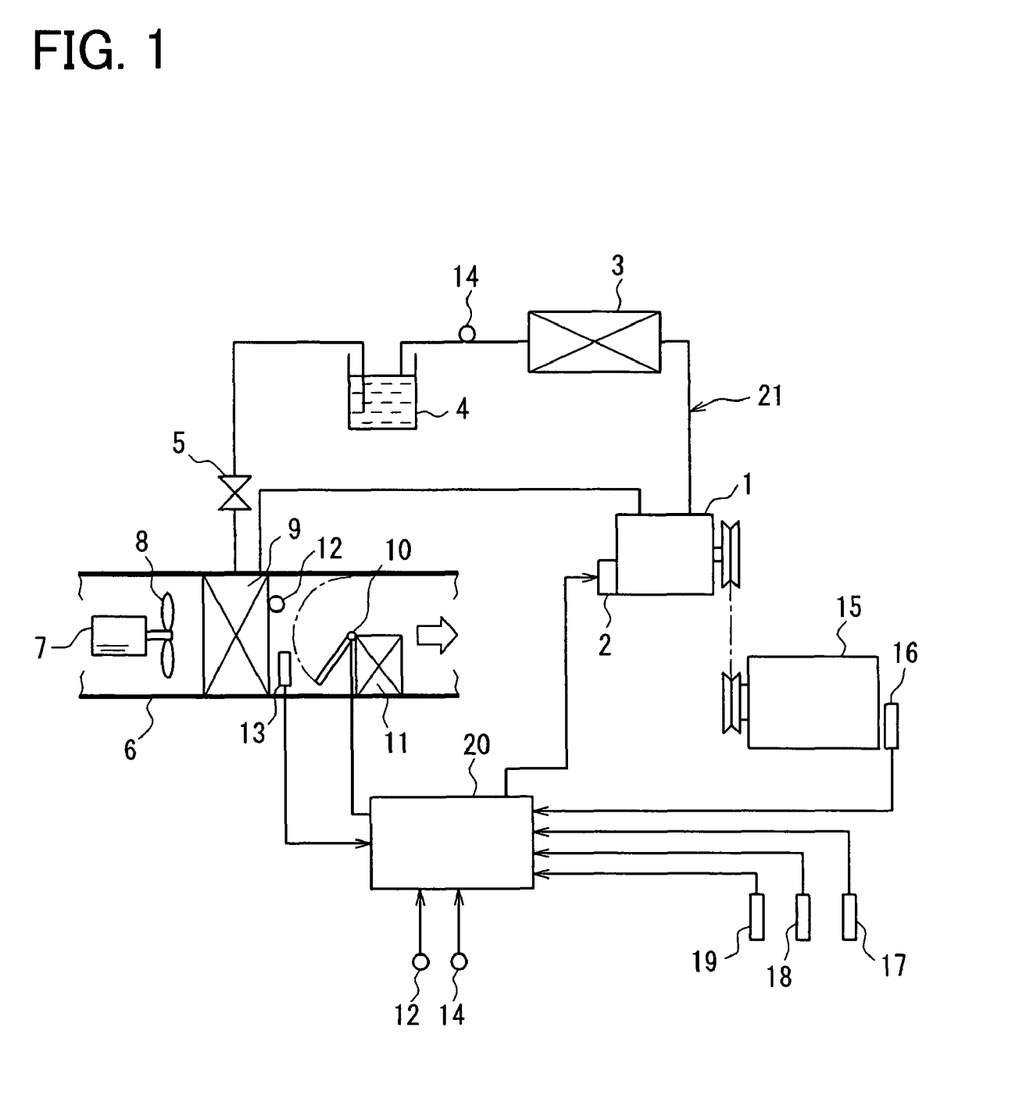
FIG. 1 is a schematic block view showing an air conditioning system according to a first embodiment of the present disclosure.

The air conditioning system has an air conditioner case 6 in which apparatuses for air-conditioning are housed, a refrigerant cycle device 21, and a control unit 20. Refrigerant for absorbing heat from blown air to cool blown air is circulated in the refrigerant cycle device 21 to flow through an evaporator 9 which is housed in the air conditioner case 6. The control unit 20 controls a driving output of a compressor 1 (which discharges refrigerant to the side of evaporator 9) by adjusting (changing) the control value of the compressor 1, to control the capability of the compressor 1.

The air conditioner case 6 can be used for a front-seat air conditioner unit and arranged in an instrument panel at the front portion of the vehicle to air-condition the front seat side of the passenger compartment. Moreover, the air conditioner case 6 can be also used for a rear-seat air conditioner unit and arranged in a trunk room or at a side trim or the like of the vehicle, to air-condition the field of the rear seat side in the passenger compartment.

The refrigerant cycle device 21 is provided therein with a refrigerant cycle in which refrigerant is circulated from the discharge side of the compressor 1 to the evaporator 9 through a condenser 3, a receiver 4 and an expansions valve 5 which is a decompression means. In this case, a pressure sensor 14 for detecting a pressure of refrigerant in the refrigerant cycle is arranged at the refrigerant passage of the discharge side of the compressor 1.

The compressor 1, which can be driven by an engine 15 mounted to the vehicle, has a capacity adjustment unit 2 which adjusts the discharge capacity of the compressor 1 according to a command from the control unit 20.

In the case where the capacity adjustment unit 2 is constructed of an electromagnetic valve apparatus, the capacity adjustment unit 2 can change the discharge capacity of the compressor 1 by a control electrical current supplied for the capacity adjustment unit 2.

The discharge capacity is proportional to the control electrical current supplied for the capacity adjustment unit 2. With the control electrical current becoming smaller, the discharge capacity of the compressor 1 will become larger (for example, discharge amount of refrigerant of the compressor 1 will become larger). In this case, the discharge amount of the compressor 1 can be continuously changed from about 0% to 100%.

The refrigerant in the refrigerant cycle device 21 can be circulated to flow through the compressor 1, the condenser 3, the receiver 4, the expansion valve 5 and the evaporator 9. In the compressor 1, the refrigerant is compressed to have a high temperature and a high pressure. The high-pressure gas refrigerant discharged from the compressor 1 is introduced to the condenser 3. In the condenser 3, the gas refrigerant is heat-exchanged with exterior air blown by a fan (not shown) for cooling, to be heat-radiated and condensed. Refrigerant having passed through the condenser 3 is separated into liquid-phase refrigerant and gas-phase refrigerant in the receiver 4, and the liquid-phase refrigerant is accumulated in the receiver 4.

Then, in the expansion valve 5, the high-pressure liquid refrigerant from the receiver 4 is decompressed into a gas-liquid diphase state having a low pressure. The decompressed low-pressure refrigerant is evaporated in the evaporator 9 by absorbing heat from blown air. The gas refrigerant having been evaporated in the evaporator 9 is sucked into the compressor 1 again to be compressed therein.

The valve opening degree of the expansion valve 5 can be also automatically adjusted so that the overheat degree of the refrigerant at the outlet of the evaporator 9 can be maintained at a predetermined value. The compressor 1, the condenser 3, the receiver 4 and the like of the refrigerant cycle device 21 can be arranged in an engine cabin (not shown) of the vehicle.

The air conditioner case 6 has therein an air passage through which air is blown into a passenger compartment of the vehicle. An outside/inside air switching box (not shown) having an inside air inlet and an outside air inlet is arranged at the substantially most upstream portion of the air passage.

An outside/inside air switching door (not shown) is rotatably arranged in the outside/inside air switching box. The outside/inside air switching door is driven by a servo motor or the like, to switch an inside air mode where inner air (air in passenger compartment) is introduced to the air passage through the inside air inlet and an outside air mode where exterior air (air outside passenger compartment) is introduced to the air passage through the outside air inlet.

A blower 8 is arranged at the downstream side of the outside/inside air switching box to cause an air flow toward the inner side of the passenger compartment. The blower 8 includes a blowing fan of a centrifugal type which is driven by a motor 7. The evaporator 9 for cooling air flowing in the air passage is arranged at the downstream side with respect to the blower 8. The evaporator 9 is a cooling heat exchanger for cooling blown air from the blower 8.

A heater core 11 for heating air having been cooled by the evaporator 9 is arranged at the downstream side with respect to the evaporator 9. The heater core 11, where cooling water of the engine 15 is used as a heat source, is a heating heat-exchanger for heating air having passed through the evaporator 9. A bypass passage in which air flows to bypass the heater core 11 is arranged at the side of the heater core 11. The temperature of cooling water of the engine 15 can be detected by a water temperature sensor 16.

The actual temperature of the evaporator 9 can be detected by an evaporator temperature sensor 12 which can be constructed by a fin sensor and the like. Moreover, the actual temperature of air of the downstream side of the evaporator 9 can be detected by an evaporator-rear temperature sensor 13.

The air mixing door 10 is rotatably arranged between the evaporator 9 and the heater core 11 and driven by a servo motor, so that the rotation position and the opening degree of the air mixing door 10 are adjustable. By adjustment of the opening degree of the air mixing door 10, warm air amount passing through the heater core 11 and cool air amount which passes through the bypass passage to bypass the heater core 11 can be adjusted. Thus, blowing-out temperature of air blown into the passenger compartment can be adjusted.

A defroster outlet (defroster blowing-out port which is not shown) through which conditioned air is blown toward window glass of the vehicle, a face outlet (not shown) through which conditioned air is blown toward the upper portion of the passenger, and a foot outlet (not shown) through which conditioned air is blown toward the lower portion of the passenger are arranged at the substantially most downstream portion of the air passage in the air conditioner case 6.

The control unit 20 (e.g., electrical control unit) can be constructed of a microcomputer including a CPU, a ROM, a ROM and the like and peripheral circuits thereof. The control unit 20 can perform various calculations and processes based on a control program for air-conditioning which is memorized in the ROM, for example.

Sensor detection signals from an inside air sensor 17, an outside air sensor 18, a solar radiation sensor 19, a pressure sensor 14, the evaporator temperature sensor 12, the evaporator-rear temperature sensor 13, a water temperate sensor 16 and the like, and operation signals from an air conditioner control panel are inputted into the control unit 20. The air conditioner control panel is arranged near the instrument panel of the front side of the driver seat in the passenger compartment, and provided with multiple switches operated by a driver and/or the passenger.

For example, the switches can include a temperature setting switch for outputting a signal for setting the temperature of the inner side of the passenger compartment, a switch for outputting a signal for manually setting the inside air mode and the outside air mode, a blowing-out mode switch for outputting a signal for manually setting the face mode, a bi-level mode, the foot mode, a foot defroster mode and the defroster mode, a wind amount setting switch for outputting a signal for manually switching the blower 8 between ON and OFF and switching the wind amount of the blower 8, and an air conditioner switch for switching the compressor 1 between an operation state and a halt state.

The control unit 20 is connected with the motor or the servo motor and the like which are electrical driving units of the apparatuses, so that the operation of the apparatuses is controlled via output signals of the control unit 20.

As shown in step S340 and step S350 in FIG. 3 (described later), the control unit 20 calculates the control current (electrical current for control) supplied for the capacity adjustment unit 2 of the compressor 1 by a PID control, based on the detected air temperature (evaporator-rear temperature) of the downstream side of the evaporator 9 and a target air temperature (target evaporator-rear temperature) of the downstream side of the evaporator 9 which is calculated from the temperature set by the temperature setting switch. Thus, the control unit 20 determines the control value of the compressor 1 to control the capability of the compressor 1. That is, the control unit 20 performs a feedback control so that the air temperature of the output side of the evaporator 9 is substantially equal to the target air temperature, and a control so that the temperature of conditioned air blown into the passenger compartment has a suitable value.

Figure 2:
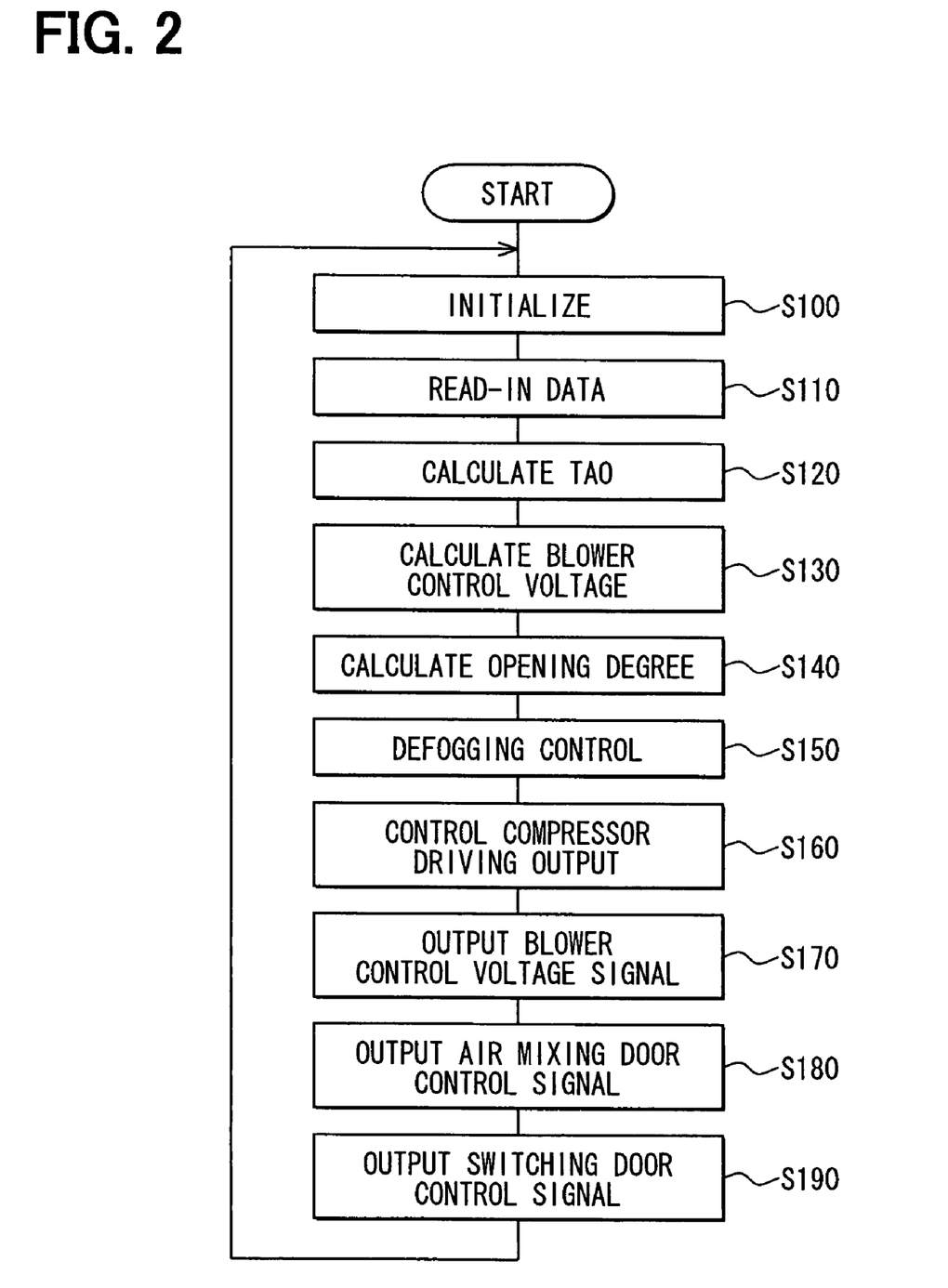
FIG. 2 is a flow chart showing basic control steps of the air conditioning system according to the first embodiment.

Next, the air conditioning control by the control unit 20 will be described with reference to FIG. 2.

At first, when an ignition switch becomes ON so that the control unit 20 is power-supplied, the execution of the control program beforehand memorized will be started. Thus, at step S100, a part of the memorization content of the data process media such as the RAM is initialized.

Next, at step S110, the control unit 20 fetches (reads-in) the various data into the data process media. That is, the operation signals from the various switches at the air conditioner control panel and the detection signals from the various sensors are inputted.

Then, at step S120, a target blowing-out temperature TAO is calculated based on these signals and a calculation formula memorized in the control program.

Next, at step S130, the control unit 20 calculates a blower control voltage which is applied to the motor 7 of the blower 8 based on the target blowing-out temperature TAO calculated at step S120, and determines the blown air amount (wind amount) of the blower 8. Based on control property patterns which are beforehand determined, the blower control voltages can be calculated to be respectively suitable for the target blowing-out temperatures TAO.

Then, at step S140, the control unit 20 calculates the opening degree (%) of the air mixing door 10 based on the above-described memorized data and calculation formula memorized in the control program.

Next, at step S150, the control unit 20 processes a window defogging control. In the window defogging control, when the inlet mode is the inside air mode and the outlet mode is the foot mode, the wind amount of the defroster mode is changed in response to the time elapsing while heating the lower portion of the passenger as the foot mode.

At step S160, the control unit 20 controls the driving output of the compressor 1. The subroutine of step S160 is shown in FIG. 3, and will be described later.

After step S160, step S170 will be performed. At step S170, the control unit 20 outputs a control signal so that the blower control voltage determined at step S130 can be provided. Then, at step S180, the control unit 20 outputs a control signal to the servo motor of the air mixing door 10 so that the air mixing door 10 has the opening degree determined at the step S140.

At step S190, the control unit 20 outputs control signals to the servo motors of the blowing-out port switching doors (outlet switching doors which are not shown) so that the outlet modes having been set can be provided. Thereafter, the process shown in FIG. 2 is repeated from step S100.

Next, the subroutine of the driving output step (step S160) of the compressor 1 will be described with reference to FIG. 3.

At first, at step S300, the control unit 20 determines whether or not the driving of the compressor for this time is an initial driving since the ignition switch becomes ON so that the control unit 20 is power-supplied.

In the case where the control unit 20 determines that the driving of the compressor for this time is the initial driving, step S310 will be performed. At step S310, the control unit 20 calculates the control value G1 for determining the driving output of the compressor 1. The control value is a ratio of the driving output to the maximum capability of the compressor 1, for example, a duty ratio used as the driving signal inputted to the compressor 1.

Specifically, at step S310, the control value G1 is calculated based on the refrigerant pressure Ph(MPa) in the refrigerant cycle device 21, by using a control property which indicates the relation between the detected refrigerant pressure and the control value. In this case, the detection position of the refrigerant pressure is not limited. That is, the refrigerant pressure can be detected at any position in the refrigerant cycle device 21. For example, the refrigerant pressure can be detected by the pressure sensor 14 at the high-pressure part of the refrigerant cycle device 21. The control property can be consisted of map type data which are beforehand memorized in the microcomputer.

Next, parameters used in the calculation of the control value G1 will be described with reference to FIGS. 4-6.

Figure 4:
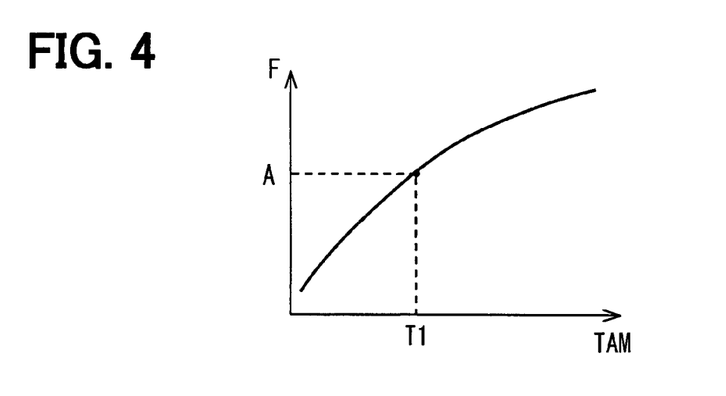
FIG. 4 is a graph showing a control map used for a calculation of a refrigerant flow amount based on an outside-air temperature according to the first embodiment.

FIG. 4 is a control map used for the calculation of the refrigerant flow amount F based on the outside-air temperature TAM. FIG. 5 is a control map which shows relations between the refrigerant flow amounts F and the refrigerant pressures Ph (which is proportional to refrigerant density) and is used for the calculation of the control value G. FIG. 6 is a control map used for the calculation of the control value G based on the refrigerant pressure Ph.

The air conditioning system is provided with the control map having the control property (as shown in FIG. 4) between the outside-air temperature (which indicates heat load) and the refrigerant flow amount. The control map is a one-to-one function through which a single value A of the refrigerant flow amount F is determined with respect to a certain value T1 of the outside-air temperature. According to the control map, the refrigerant flow amount will increase in response to an increase of the outside-air temperature (increase of heat load). Thus, at the heat load whose level can be recognized by the detected outside-air temperature, the air conditioning system can calculate the refrigerant flow amount by which the evaporator temperature can early reach the target value TEO without overshooting as shown in FIG. 11.

Figure 5:
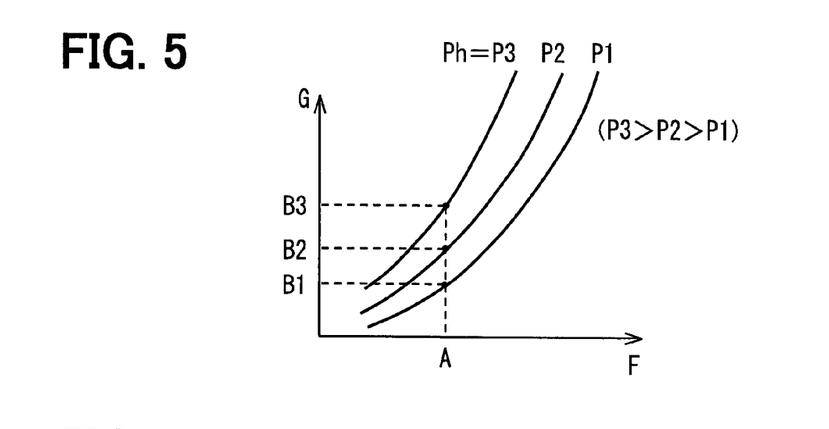
FIG. 5 is a graph showing a control map which indicates relations between the refrigerant flow amount and a refrigerant pressure and is used for a calculation of a control value according to the first embodiment.

Thus, air conditioning system calculates the control value which satisfies the refrigerant flow amount value A calculated based on the outside-air temperature value T1, by using the memorized control map shown in FIG. 5. The control map is consisted of one-to-one functions (which are respectively indicated by curves P3-P1, for example,) through each of which the single value of the control value can be determined based on the value of the refrigerant pressure Ph with respect to the refrigerant flow amount value A which is to be ensured. According to the control map, the control value will become large (that is, driving output of compressor will become large) in response to the increase of the refrigerant flow amount which is to be ensured.

The curves in FIG. 5 respectively correspond to, for example, the values P1-P3 of the refrigerant pressure which is proportional to the refrigerant density. In this case, the pressure value P3 is largest among P1-P3, and the pressure value P1 is smallest among P1-P3. Thus, the density value corresponding to the pressure value P3 is largest, and the density value corresponding to the pressure value P1 is smallest.

That is, in the case of the pressure value P1, the control value is determined to have a value B1 corresponding to the value A of the refrigerant flow amount F according to the curve of the pressure value P1. Similarly, in the case of the pressure value P2, the control value is determined to have a value B2 corresponding to the value A of the refrigerant flow amount F according to the curve of the pressure value P2. In the case of the pressure value P3, the control value is determined to have a value B3 corresponding to the value A of the refrigerant flow amount F according to the curve of the pressure value P3.

Moreover, in the case where the pressure Ph is larger than or equal to the pressure P3, the control value is set to be B3 with respect to the refrigerant flow amount value A. In the case where the pressure Ph is smaller than or equal to the pressure value P1, the control value is set to be B1 with respect to the refrigerant flow amount value A. Furthermore, in the case where the pressure Ph has a value between the pressure value P3 and the pressure value P2 or the case where the pressure Ph has a value between the pressure value P2 and the pressure value P1, the control value is calculated by an interpolation method between these curves.

Figure 6:
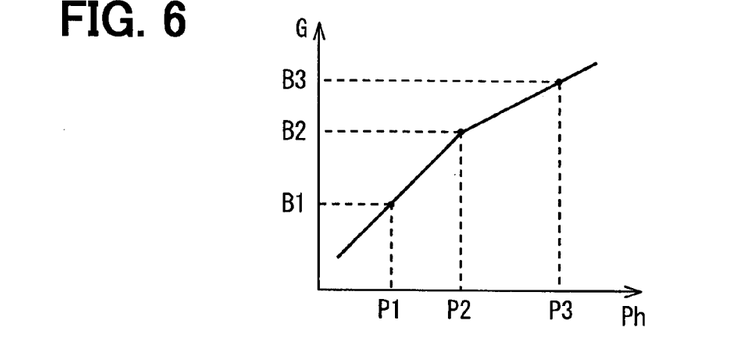
FIG. 6 is a graph showing a control map which is used for the calculation of the control value based on the refrigerant pressure according to the first embodiment.

Moreover, the air conditioning system can also calculate the control value G which satisfies the desirable refrigerant flow amount value A based on the refrigerant pressure Ph, by using the control map shown in FIG. 6. The control map can be consisted of a one-to-one function through which the single control value is determined based on the value of the refrigerant pressure Ph (indicating heat load). According to the control map, the control value will become large (that is, driving output of compressor will become large) in response to the increase of the refrigerant pressure Ph. In this case, the air conditioning system can calculate the control value by which the evaporator temperature can early reach the target value TEO without overshooting as shown in FIG. 11, according to the heat load indicated by the detected refrigerant pressure. The control map can be memorized in the control unit 20, for example.

Alternatively, the air conditioning system can also beforehand memorize the refrigerant flow amount flowing through the refrigerant cycle device when the air temperature of the downstream side of the evaporator 9 is stable at the predetermined value. In this case, the refrigerant flow amount of the stable state can be memorized at a storage unit, for example, the control unit 20. Thus, the control unit 20 or the like can determine the control value G based on the detected refrigerant pressure and the memorized refrigerant flow amount of the stable state. The temperature having the predetermined value is a temperature at which the evaporator 9 does not overshoot (that is, the evaporator 9 is not excessively cool).

A flow amount control type compressor (which is a variable capacity type compressor) has the property that the control value for the predetermined flow amount varies due to the refrigerant pressure. Therefore, the control value for the predetermined flow amount can be determined by detecting the refrigerant pressure. When the compressor is actuated at this control value, the refrigerant in the refrigerant cycle can be restricted from excessively flowing so that overcooling can be restricted. Therefore, overshoot can be reduced. In this case, the predetermined refrigerant flow amount F can be calculated according to the control map obtained by experiments or the like. The predetermined refrigerant flow amount F is a flow amount at which the temperature of the downstream side of the evaporator 9 is beforehand stable at a predetermined value.

Moreover, for a suction-pressure control type compressor where the refrigerant flow amount is related to the suction pressure of the compressor, the suction pressure of the compressor is related to the pressure of the high pressure side of the refrigerant so that the control value for the predetermined suction pressure can be determined based on the pressure of the high pressure side. When the compressor is actuated at this control value, the refrigerant in the refrigerant cycle can be restricted from excessively flowing so that the overcooling can be reduced. Therefore, the overshoot can be restricted. In this case, the predetermined suction pressure can be calculated according to the control map obtained by experiments or the like. The predetermined suction pressure is a suction pressure at which the temperature of the downstream side of the evaporator is beforehand stable at a predetermined value.

Thus, the air conditioning system can beforehand memorize the suction pressure corresponding to the refrigerant flow amount when the temperature of the downstream side of the evaporator 9 is stable at the predetermined value. In this case, the suction pressure can be memorized in the storage unit or the like. Thus, the control unit 20 or the like can determine the control value G based on the detected refrigerant pressure and the memorized suction pressure of the stable state.

After step S310 where the control unit 20 calculates the control value G1 based on the detected pressure Ph, step S320 will be performed. At step S320, it is determined that this control value G1 is to be used in the control of the compressor 1 for this time. Then, at step S330, the control unit 20 uses the determined control value G1 as the duty ratio of the initial driving output for actuating the compressor 1, so that the discharge amount of the compressor 1 is controlled.

Figure 3:
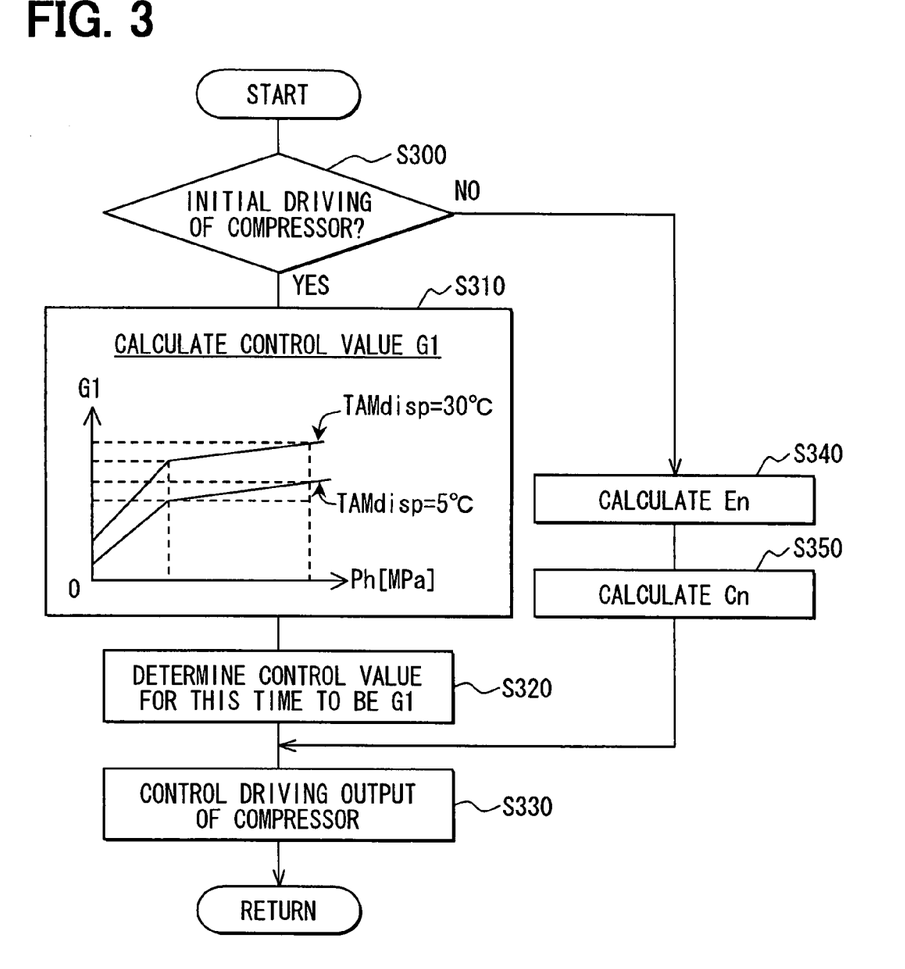
FIG. 3 is a flow chart showing a control procedure of a compressor driving output step according to the first embodiment.

When the subroutine shown in FIG. 3 is performed, it is determined at step S300 how many times the driving of the compressor 1 has been performed till the current time. That is, after it is determined at step S300 that the driving of the compressor 1 is first time and then step S330 is performed, it will be determined at subsequent step S300 (before power supply for control unit 20 is stopped) that the driving of the compressor 1 is not the driving for the first time. That is, the determining result of step S300 is "NO". Then, step S340, step S350 and step S330 will be performed.

In the case where the control unit 20 determines at step S300 that the driving of the compressor 1 for this time is not the driving for the first time, that is, the driving for the second time or later, the PID control which is a kind of feedback control will be performed. Specifically, at step S340, the control unit 20 calculates a difference $E_n$ between the target evaporator-rear temperature and the actual evaporator-rear temperature detected by the evaporator-rear temperature sensor 13. At step S350, the control unit 20 calculates the control value used in the control for this time based on the following formula (1), for example.

$$C_n = C_{n-1} + KP \times (E_n - E_{n-1}) + E_{n-1}/10 \tag{1}$$

wherein $C_n$ represents a control value used in the control for this time. $C_{n-1}$ represents a control value used in the control for last time. KP is a proportional gain. For example, KP can be equal to 2.0. $E_n$ (this time) represents a difference between the target evaporator-rear temperature and the actual evaporator-rear temperature calculated at step S340. $E_{n-1}$ (last time) represents the calculated value when the compressor 1 is driven last time. $C_{n-1}$ and $E_{n-1}$ which are actual data memorized in the data processing memory (e.g., RAM) are read from the data processing memory.

The counting of the driving times of the compressor 1 is once reset, in the case where the ignition switch is switched from ON into OFF, and in the case where the air conditioner switch is operated by the passenger or the like to become OFF, and in the case where the switch for stopping only the driving of the compressor 1 (for example, switch for setting wind amount) is operated so that the compressor 1 is stopped.

Subsequently, after the ignition switch is switched into ON or the air conditioner switch (or switch for setting wind amount) becomes ON so that the control unit 20 is power-supplied, it is determined that the determining at step S300 is the driving for the first time. Then, step S310, step S320, and step S330 will be performed.

At step S330, the control unit 20 processes with the control value (calculated as described above) being used as the duty ratio of the initial driving output for actuating the compressor 1, so that the discharge amount pf the compressor 1 is controlled. In this case, the calculation of the control ratio in the subroutine is renewed once a second, for example.

Alternatively, in the calculation of the control value G1 at step S310, the control unit 20 can also select the control property used for the calculation from the multiple properties memorized therein to calculate the control value corresponding to the outside-air temperature detected by the outside air sensor 18. The multiple control properties (representing relation between refrigerant pressure and control value) are memorized in the control unit 20 to respectively correspond to the predetermined outside-air temperatures TAMdisp.

For example, with reference to step S310 shown in FIG. 3, the control property corresponding to TAMdisp of 5° C. and the control property corresponding to TAMdisp of 30° C. can be memorized. In the case where the multiple control properties are memorized, the control unit 20 can be provided with a threshold value between 5° C. and 30° C. When the detected outside-air temperature is smaller than the threshold value, the control value G1 will be calculated based on the detected pressure Ph with using the control property corresponding to 5° C. On the other hand, when the detected outside-air temperature is larger than or equal to the threshold value, the control value G1 will be calculated based on the detected pressure Ph with using the control property corresponding to 30° C.

Moreover, the control value G1 can be also calculated by other methods. For example, the control unit 20 can calculate the control value G1 based on the detected pressure Ph by using the control property corresponding to 5° C. in the case where the detected outside-air temperature is lower than or equal to 5° C., and the control unit 20 can calculate the control value G1 based on the detected pressure Ph by using the control property corresponding to 30° C. in the case where the detected outside-air temperature is higher than or equal to 30° C. Furthermore, in the case where the detected outside-air temperature is between 5° C. and 30° C., the control unit 20 calculates the control value G1 based on the detected pressure Ph by using the interpolation method between the control property corresponding to 30° C. and that corresponding to 5° C.

Thus, when the compressor 1 is actuated, the control unit 20 drives the compressor 1 by the control value which is determined based on the pressure of the refrigerant in the refrigerant cycle. According to this control, the operation at an excessive control value with respect to the heat load exerted on the evaporator 9 at startup can be restricted, so that the freezing of the evaporator 9 when the evaporator 9 is temporarily excessively cool can be restricted. Therefore, the leakage of an offensive smell into the passenger compartment can be reduced. Moreover, at the startup of the compressor 1, the control value is determined based on the pressure of the refrigerant in the refrigerant cycle. Therefore, the cooling capability can be restricted from being excessively lowered while the freezing can be reduced.

Moreover, preferably, the control unit 20 determines the control value when the compressor 1 is actuated, based on the refrigerant pressure in the refrigerant cycle and the outside-air temperature outside the passenger compartment. In the case where this control is used, the heat load exerted on the evaporator 9 at startup can be more substantially detected because the pressure balance point of the refrigerant depends on the outside-air temperature.

In this case, the control unit 20 memorizes the multiple control properties (for determining control value based on pressure of refrigerant in refrigerant cycle) respectively corresponding to the predetermined outside-air temperatures, and determines the control value by selecting the control property (used for calculation) from the multiple control properties in response to the outside-air temperature when the compressor 1 is actuated.

In the case where this control is used, the control which has the more efficient control procedure and is capable of corresponding to the broad outside-air temperature condition can be provided.

Moreover, the compressor 1 can be constructed of the variable capacity type compressor having the compression capacity which is variable. Therefore, the air temperature of the downstream side with respect to the evaporator 9 can be smoothly changed, as compared with an ON/OFF type compressor which is capacity fixed type. Thus, the overshoot of the actual air temperature of the downstream side with respect to the evaporator 9 can be substantially reduced.

Second Embodiment

A second embodiment of the present invention will be described with reference to FIG. 7 which shows the subroutine of step S160 (that is, driving output step) in FIG. 2.

Figure 7:
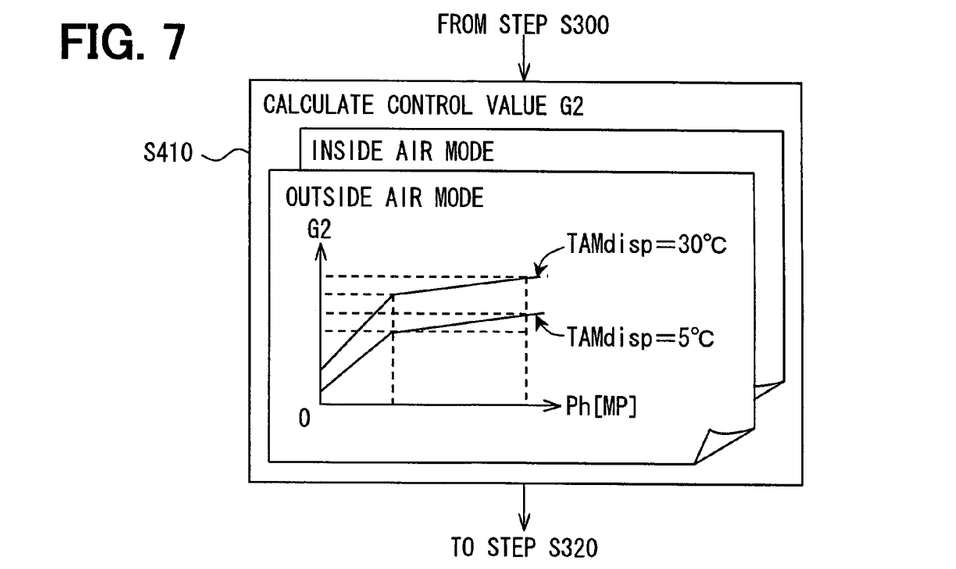
FIG. 7 is a chart showing a calculation process of a control value in a control procedure of a compressor driving output step according to a second embodiment of the present disclosure.

The control procedure of the driving output step of the compressor 1 according to the second embodiment is different from that of the first embodiment only at step S410 shown in FIG. 7. That is, the subroutine (shown in FIG. 3) of step S160 (in FIG. 2) is provided with step S410 shown in FIG. 7 instead of step S310.

In this case, at first, it is determined at step S300 whether or not the current driving of the compressor is the initial driving since the ignition switch becomes ON so that the control unit 20 is power-supplied. In the case where it is determined that the driving for this time is the initial driving, step S410 will be performed.

At step S410, the control value G2 for determining the driving output of the compressor 1 is calculated. In this case, the control value G2 is calculated based on the outside-air temperature outside the passenger compartment which is greatly related to the heat load of the evaporator 9. The process at step S410 is performed by using the control properties which indicate the relations between the outside-air temperatures detected by the outside air sensor 18, the detected refrigerant pressure Ph and the control values G2. The control property can be consisted of map type data which are beforehand memorized in the microcomputer, for example.

In this case, each of the inside air mode and the outside air mode can be provided with the multiple control properties memorized in the control unit 20. In the calculation of the control value G2 at step S410, the control unit 20 can select the control property corresponding to the current mode (e.g., outside air mode or outside air mode) to calculate control value.

The control map of the each mode is provided with the multiple control properties (which are memorized in control unit 20 and indicate relations between refrigerant pressure Ph and control value G2) respectively corresponding to the predetermined outside-air temperatures TAMdisp (e.g., 30° C. and 5° C. with reference to step S410 shown in FIG. 7). The control unit 20 selects the control property used for the calculation in response to the detected outside-air temperature to calculate the control value G2.

In the case where the control unit 20 determines that the current mode is the outside air mode, the control unit 20 uses the beforehand-memorized control property corresponding to the outside air mode to calculate the control value G2 based on the detected outside-air temperature. On the other hand, in the case where the control unit 20 determines that the current mode is the inside air mode, the control unit 20 uses the beforehand-memorized control property corresponding to the inside air mode to calculate the control value G2 based on the detected outside-air temperature.

In the inside air mode, because the air inside the passenger compartment which has a relatively high humidity is taken in as air for air-conditioning, it is desirable to heighten the dehumidification capability of the air conditioner to reduce the window cloud. Thus, the control property corresponding to the inside air mode is provided with the control value (with respect to outside-air temperature) which is 15% higher than that of the control property corresponding to the outside air mode.

After step S410, the control unit 20 determines that the calculated control value G2 is to be used for the control of the compressor 1 for this time (corresponding to step S320). Then, the control unit 20 processes with the determined control value G2 used as the duty ratio of the initial driving output for actuating the compressor 1 so that the discharge flow amount of the compressor 1 is controlled (corresponding to step S330).

Thus, according to this embodiment, when the compressor 1 is actuated, the control unit 20 drives the compressor 1 by the control value which is determined based on the outside-air temperature.

According to this control, the operation at an excessive control value with respect to the heat load exerted on the evaporator 9 at startup can be restricted, so that the overshoot (because evaporator 9 is temporarily excessively cool) of the air temperature of the downstream side with respect to the evaporator 9 can be reduced.

Moreover, at the startup of the compressor 1, the control value is determined based on the outside-air temperature. Therefore, the cooling capability can be restricted from being excessively lowered while the freezing can be reduced.

In this embodiment, the control unit 20 determines the control value when the compressor 1 is actuated, in response to the current mode (e.g., inside air mode where air in passenger compartment is taken in or outside air mode where air outside passenger compartment is taken in).

In the case where the above-described control is performed, the control value of the compressor 1 is determined in response to air blown to the evaporator 9. That is, the different control values of the compressor 1 can be provided respectively in the case where air blown to the evaporator 9 is the outside air and in the case where air blown to the evaporator 9 is the inside air. Therefore, the suitable control value can be provided for the heat load exerted on the evaporator 9. Particularly, in the case of the inside mode, the control for actuating the compressor 1 at the control value having a high window tarnish-inhibiting effect can be performed.

About the air conditioning system, what has not been described in the second embodiment is the same with the first embodiment.

Third Embodiment

A third embodiment of the present invention will be described with reference to FIG. 8 which shows the subroutine of step S160 in FIG. 2.

Figure 8:
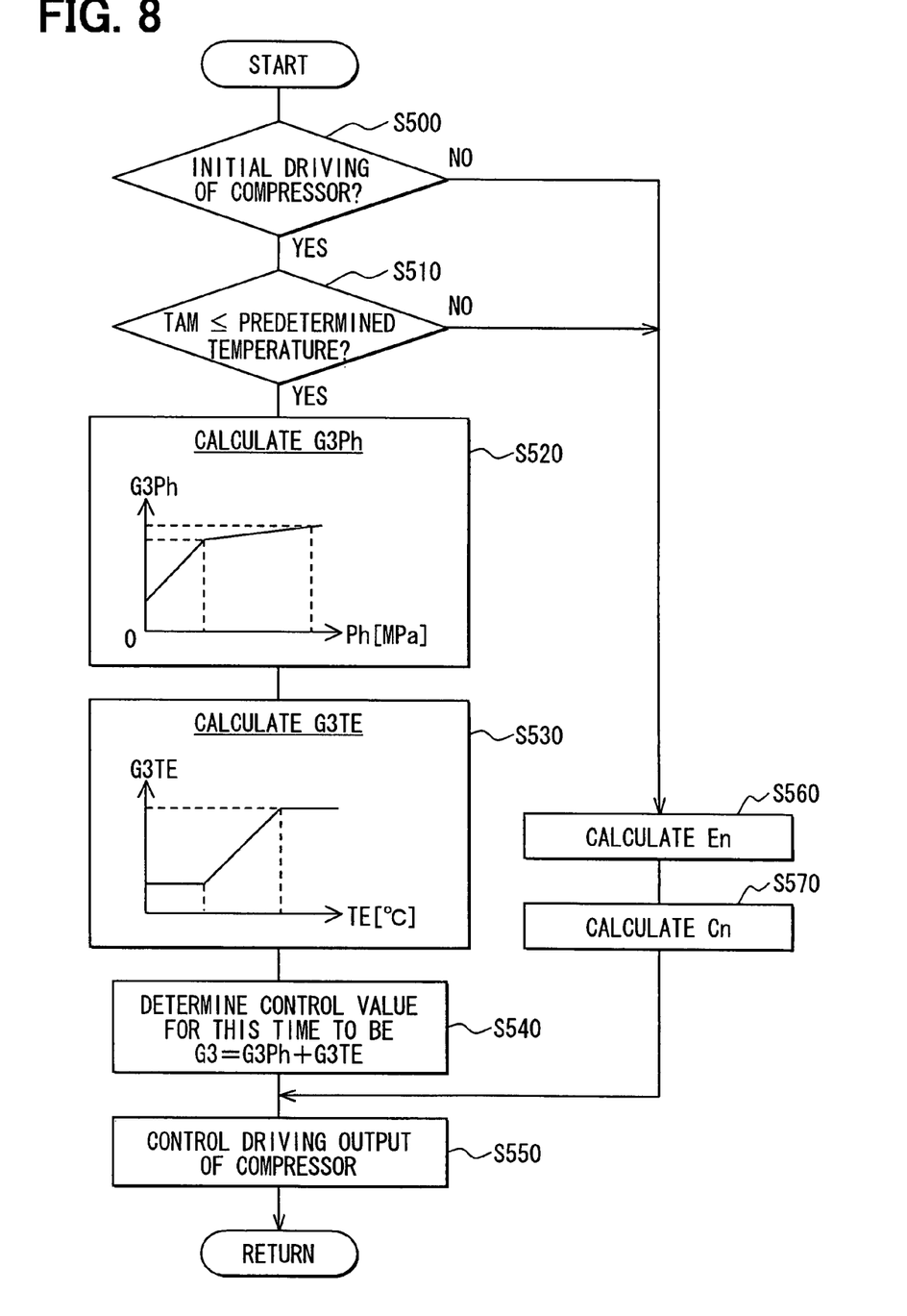
FIG. 8 is a flow chart showing a control procedure of a compressor driving output step according to a third embodiment of the present disclosure.

In this case, steps S500, S550, S560 and S570 shown in FIG. 8 are respectively same with steps S300, S330, S340 and S350 in the subroutine shown in FIG. 3.

At first, when it is determined by the control unit 20 at step S500 that the driving of the compressor for this time is the initial driving since the ignition switch becomes ON so that the control unit 20 is power-supplied, step S510 will be performed.

At step S510, it is determined whether or not the outside-air temperature TAM detected by the outside air sensor 18 is lower than or equal to a predetermined temperature. In the case where it is determined at step S510 that the outside-air temperature (related to heat load of evaporator 9) is higher than the predetermined temperature, it is considered that the possibility for the evaporator 9 to freeze is low so that the above-described PID control at steps S560 and S570 is performed. On the other hand, in the case where it is determined at step S510 that the outside-air temperature is lower than or equal to the predetermined temperature, it is considered that the evaporator 9 may freeze so that the control of the driving output of the compressor 1 by using the control value determined at steps S520, S530, and S540 is performed.

In this case, the predetermined temperature has a threshold value beforehand memorized in the microcomputer. The predetermined temperature can be determined, in such a manner that the evaporator 9 freezes or there is the possibility for the evaporator 9 to freeze (in the case where compressor 1 is driven at control value by PID control) when the outside-air temperature is lower than or equal to the predetermined temperature. For example, in this embodiment, the predetermined temperature can be substantially equal to 22° C.

In the case where it is determined that the outside-air temperature is lower than or equal to the predetermined temperature, step S520 will be performed. At step S520, a control value factor G3Ph is calculated based on the pressure of the refrigerant in the refrigerant cycle device 21. The calculation is performed by using the map type control property which is beforehand memorized in the microcomputer and indicates the relation between the detected pressure Ph of the refrigerant and the control value factor G3Ph.

In this case, the detection position of the refrigerant pressure is not limited if the pressure is a refrigerant pressure in the refrigerant cycle device 21. In this embodiment, the pressures Ph of the refrigerant can be detected at a high-pressure part in the refrigerant cycle device 21 by the pressure sensor 14.

After step S520, step S530 will be performed. At step S530, anther control value factor G3TE is calculated based on the air temperature TE (detected by evaporator-rear temperature sensor 13) of the downstream side with respect to the evaporator 9. The calculation is performed by using the map type control property which is beforehand memorized in the microcomputer and indicates the relation between the detected air temperature TE and the control value factor G3TE.

Next, at step S540, the calculated control value factors G3Ph and G3TE are added to calculate the control value G3 used in the control for this time and determine to use the control value G3 for the control of the compressor 1 for this time. Because the control value factor G3TE is used for the calculation of the final control value G3, the refrigerant cycle can be further cooled to dehumidify with respect to the control value factor G3Ph calculated based on the refrigerant Ph. Therefore, the use of the control value factor G3TE for the calculation of the final control value G3 is effective to reduce the window clouding (defog) in the case of the inside air mode.

Then, at step S550, the control unit 20 processes with the control value G3 (determined as described above) used as the duty ratio of the initial driving output for actuating the compressor 1, so that the discharge amount of the compressor 1 is controlled.

According to this embodiment, the control unit 20 determines the control value when the compressor 1 is actuated based on the refrigerant in the refrigerant cycle and the air temperature of the downstream side with respect to the evaporator 9. Thus, the heat load exerted on the evaporator 9 at the startup can be detected with an improved accuracy.

In this case, the above-described control for determining the control value can be performed in the case where the outside-air temperature (outside passenger compartment) is lower than or equal to the predetermined temperature. In the case where this control is used, the PID control can be performed at the outside-air temperature where the possibility for the evaporator 9 to freeze is low. Therefore, the freezing of the evaporator 9 can be restricted and the cooling capability can be maintained.

About the air conditioning system, what has not been described in the third embodiment is the same with the first embodiment.

Fourth Embodiment

A fourth embodiment of the present invention will be described with reference to FIG. 9 which shows the subroutine of step S160 in FIG. 2.

Figure 9:
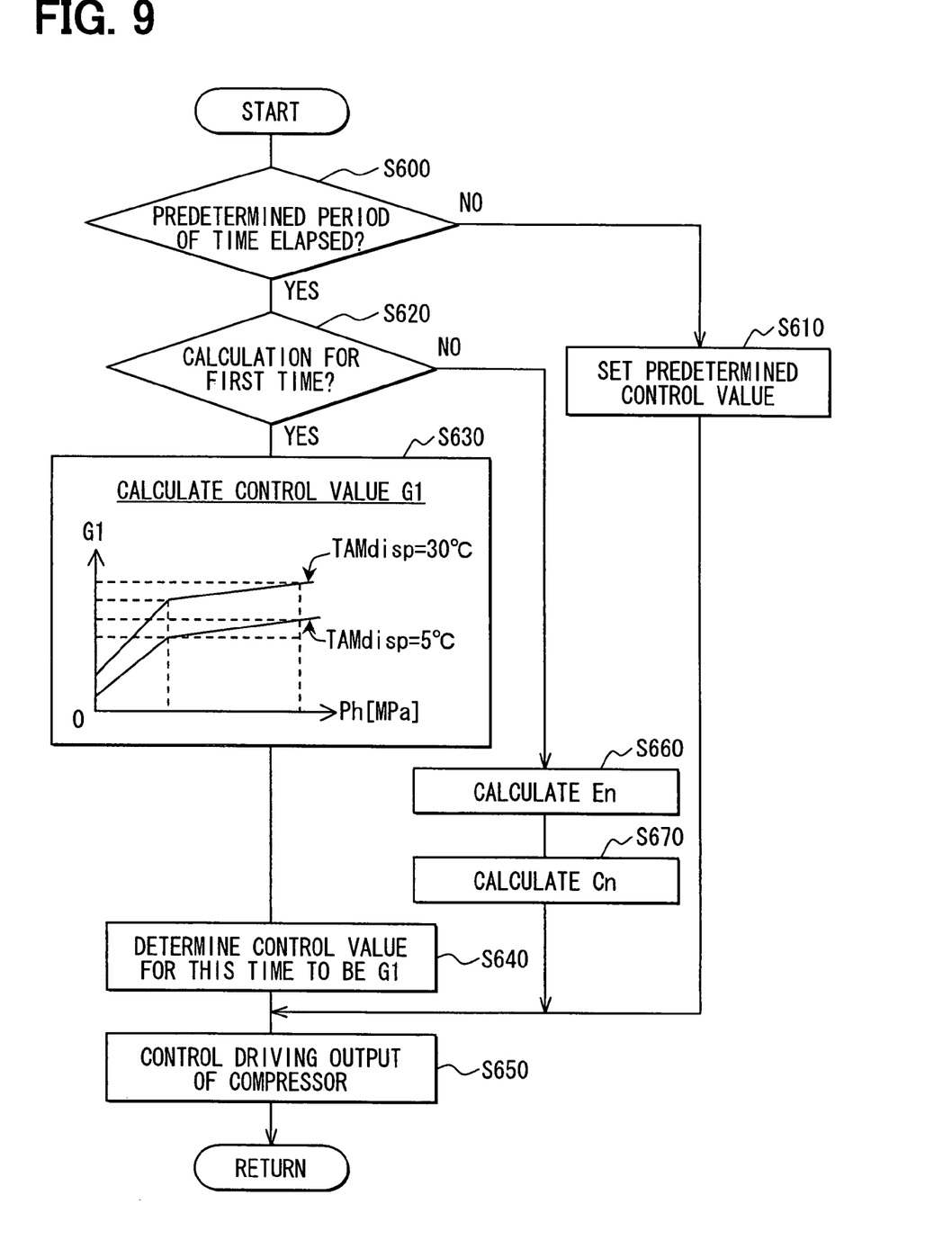
FIG. 9 is a flow chart showing a control procedure of a compressor driving output step according to a fourth embodiment of the present disclosure.

According to this embodiment, the processes at steps S630, S640, S650, S660 and S670 shown in FIG. 9 are respectively same with those at steps S310, S320, S330, S340 and S350 in the subroutine shown in FIG. 3.

At first, at step S600, the control unit 20 determines whether or not a predetermined period of time (e.g. 5 sec) has elapsed since the ignition switch becomes ON so that the control unit 20 is power-supplied. That is, the control unit 20 determines whether or not a control value setting condition for setting the driving output of the compressor 1 is detected after the startup of the compressor 1.

In the case where it is determined that the predetermined period of time has not elapsed, step S610 will be performed.

At step S610, the control unit 20 set the predetermined control value to be, for example, 50% with respect to the maximum capability.

After step S610, step S650 is performed. At step S650, the control unit 20 processes with the predetermined control value used as the duty ratio of the initial driving output for actuating the compressor 1 so that the discharge amount of the compressor 1 is controlled.

In this case, the start time of the predetermined period of time can be set as the time when the control unit 20 starts the control for determining the control value to actuate the compressor 1. Alternatively, the start time can be also set as the time when the ignition switch becomes ON, or the time when the air conditioner switch becomes ON, or the time when the wind amount setting switch becomes ON.

On the other hand, in the case where it is determined at step S600 by the control unit 20 that the predetermined period of time has elapsed (that is, control value setting condition for setting the driving output of the compressor 1 is detected after the startup of compressor 1), step S620 will be performed to determine whether or not the calculation of the control value for this time is a calculation for the first time after the predetermined period of time has elapsed.

In the case where the control unit 20 determines that the calculation is a calculation for the second time or later, it is considered that the possibility for the evaporator 9 to freeze is low so that the above-described PID control at steps S660 and S670 is controlled. On the other hand, in the case where it is determined that the calculation is the calculation for the first time, it is considered that the evaporator 9 may freeze so that the driving output of the compressor 1 by using the control value determined at steps S630 and S640 is controlled at step S650.

According to the subroutine shown in FIG. 9, after the compressor 1 is actuated, in the case where the control value setting condition for setting the driving output of the compressor 1 has been detected, the control for actuating the compressor 1 at the control value (which is determined based on at least one of refrigerant pressure in refrigerant cycle device 21 and outside-air temperature) is performed.

According to this control, the operation at an excessive control value with respect to the heat load exerted on the evaporator 9 at startup can be restricted, so that the freeze (because the evaporator 9 is temporarily excessively cool) of the evaporator 9 can be reduced. Moreover, the effective control without excessively lowering the capability of the compressor 1 can be provided for the air conditioning system.

Moreover, in this embodiment, the control value setting condition is set to be that the predetermined period of time has elapsed since the control unit 20 starts the control for determining the control value to actuate the compressor 1. Therefore, the control delay at the startup of the compressor 1, that is, time lag can be restricted, and the state that the possibility of freeze is low at times can be assessed.

About the air conditioning system, what has not been described in the fourth embodiment is the same with the first embodiment.

Fifth Embodiment

A fifth embodiment of the present invention will be described with reference to FIG. 10 which shows the subroutine of step S160 in FIG. 2.

Figure 10:
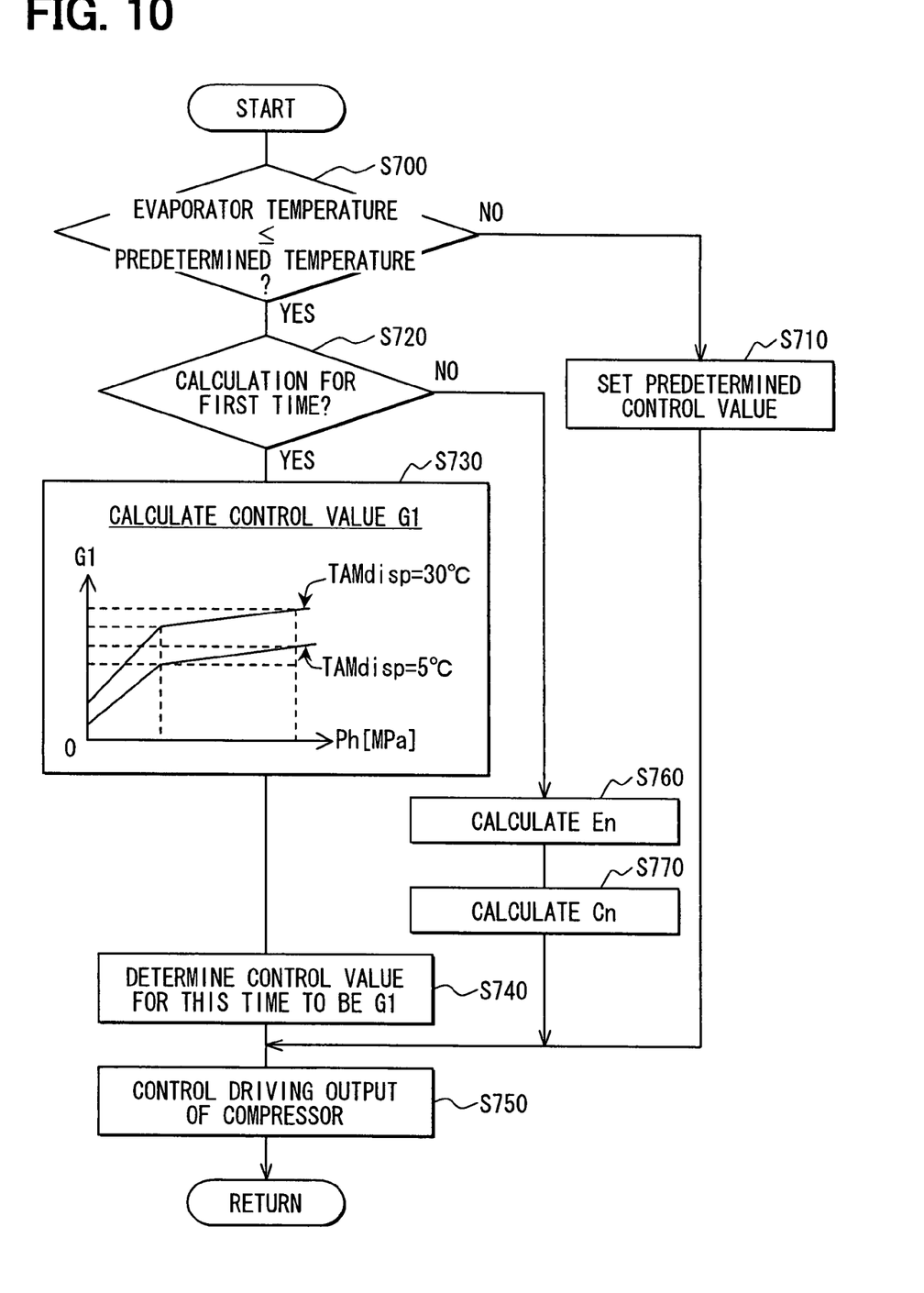
FIG. 10 is a flow chart showing a control of a compressor of an air conditioning system according to a fifth embodiment of the present disclosure.

According to the subroutine (of step S160 in FIG. 2) shown in FIG. 10 of this embodiment, only the process at step S700 is different as compared with the subroutine shown in FIG. 9 described in the fourth embodiment.

With reference to FIG. 10, at first, at step S700, it is determined whether or not the temperature of the evaporator 9 detected by the evaporator temperature sensor 12 is lower than or equal to the predetermined temperature (that is, whether or not control value setting condition for setting the driving output of the compressor 1 is detected after the startup of compressor 1), after the ignition switch becomes ON so that the control unit 20 is power-supplied.

In this case, the predetermined temperature is a threshold value beforehand memorized in the microcomputer. The predetermined temperature can be determined, in such a manner that the evaporator 9 freezes or there is the possibility for the evaporator 9 to freeze (in the case where compressor 1 is driven at control value by PID control) when the actual temperature of the evaporator 9 is lower than or equal to the predetermined temperature. For example, in this embodiment, the predetermined temperature can be substantially equal to In the case where it is determined by the control unit 20 at step S700 that the temperature of the evaporator 9 is higher than the predetermined temperature, step S710 will be performed. At step S710, the control unit 20 sets the predetermined control value so that the compressor 1 is provided with the substantially maximum capability, for example. Thereafter, at step S750, the control unit 20 processes with the predetermined control value used as the duty ratio of the initial driving output for actuating the compressor 1 so that the discharge amount of the compressor 1 is controlled.

On the other hand, in the case where it is determined by the control unit 20 at step S700 that the temperature of the evaporator 9 is lower than or equal to the predetermined temperature (that is, control value setting condition for setting the driving output of compressor 1 is detected after the startup of the compressor 1), step S720 will be performed to determine whether or not the calculation of the control value for this time is a calculation for the first time after the predetermined period of time has elapsed since the control unit 20 is power-supplied when the ignition switch becomes ON.

In the case where the control unit 20 determines that the calculation is a calculation for the second time or later, it is considered that the possibility for the evaporator 9 to freeze is low so that the above-described PID control at steps S760 and S770 is performed. After step S770, step S750 will be performed.

On the other hand, in the case where it is determined that the calculation is the calculation for the first time, it is considered that the evaporator 9 may freeze so that the driving output of the compressor 1 by using the control value G1 determined at steps S730 and S740 is controlled at step S750.

According to this embodiment, the control value setting condition for setting the driving output of the compressor 1 after the startup of the compressor 1 is set to be that the temperature of the evaporator 9 after the control unit 20 starts the control for determining the control value to actuate the compressor 1 is lower than or equal to the predetermined temperature.

Thus, the control for driving the compressor 1 at a large control value can be performed until the evaporator 9 is cooled to have the substantially predetermined temperature at which it is considered that the possibility of freeze is low. Therefore, the scarcity of the cooling capability at the startup can be restricted.

About the air conditioning system, what has not been described in the fifth embodiment is the same with the first embodiment.

Other Embodiments

Although the present invention has been fully described in connection with the preferred embodiments thereof with reference to the accompanying drawings, it is to be noted that various changes and modifications will become apparent to those skilled in the art.

For example, the refrigerant pressure in the refrigerant cycle can be detected by the pressure sensor 14 arranged in the high-pressure part. However, the pressure sensor 14 can be also arranged in any position (in the refrigerant cycle) where refrigerant flows. For example, the refrigerant pressure can be detected by the pressure sensor 14 arranged at a low-pressure part in the refrigerant cycle.

Moreover, the compressor 1 can be constructed of the variable capacity type compressor, or a fixed capacity type compressor.

Moreover, the compressor 1 can be also constructed of an electrically-powered type compressor which uses power of a battery or the like.

Moreover, the refrigerant flowing in the refrigerant cycle device 21 is not limited. For example, the refrigerant can be carbon dioxide, ethylene, ethane, nitrogen oxide or the like.

Such changes and modifications are to be understood as being in the scope of the present invention as defined by the appended claims.

What is claimed is:

1. An air conditioning system for a vehicle, comprising: a refrigerant cycle device which has an evaporator and a compressor and in which refrigerant is discharged from the compressor to be evaporated in the evaporator so that air passing through the evaporator is cooled to be blown into a passenger compartment of the vehicle; and a control unit which calculates a control value for determining a driving output of the compressor to control an operation of the compressor, wherein the control unit determines whether the compressor is in an initial driving time only after power has initially been supplied to the control unit and the compressor has not been actuated after the power has initially been supplied to the control unit; the control unit determines the control value based on a pressure of the refrigerant in the refrigerant cycle device, only when the compressor is determined to be in the initial driving time after the power has initially been supplied to the control unit and wherein the control unit drives the compressor by the determined control value when the control unit actuates the compressor after the initial driving time after the power has initially been supplied to the control unit, and the control unit determines the control value based on a difference in a target air temperature and an actual air temperature at a downstream side of the evaporator, when the control unit has actuated the compressor after the initial driving time and the power is still being supplied to the control unit.

2. The air conditioning system according to claim 1, wherein
the control unit determines the control value based on the pressure of the refrigerant in the refrigerant cycle device and an outside-air temperature outside the passenger compartment at the initial driving time of the compressor.

3. The air conditioning system according to claim 1, wherein:
the control unit memorizes therein a plurality of control properties respectively corresponding to predetermined values of an outside-air temperature, for the sake of determining the control value based on the pressure of the refrigerant in the refrigerant cycle device; and
the control unit selects one control property for the calculation from the plurality of control properties in response to the outside-air temperature when the compressor is actuated, to determine the control value at the initial driving time of the compressor.

4. The air conditioning system according to claim 1, wherein
the control unit determines the control value based on the pressure of the refrigerant in the refrigerant cycle device and an air temperature of a downstream side with respect to the evaporator at the initial driving time of the compressor.

5. The air conditioning system according to claim 1, further comprising
a storage unit which beforehand memorizes therein a refrigerant flow amount flowing through the refrigerant cycle device of a stable state where an air temperature of a downstream side with respect to the evaporator is substantially stable at a predetermined value, wherein
the control unit determines the control value based on the refrigerant pressure and the memorized refrigerant flow amount of the stable state at the initial driving time of the compressor.

6. The air conditioning system according to claim 5, wherein
the storage unit is constructed of the control unit.

7. The air conditioning system according to claim 1, further comprising
a storage unit which beforehand memorizes therein a suction pressure corresponding to a refrigerant flow amount flowing through the refrigerant cycle device of a stable state where an air temperature of a downstream side with respect to the evaporator is substantially stable at a predetermined value, wherein:
the compressor is a suction-pressure control type compressor where the refrigerant flow amount is related to the suction pressure; and
the control unit determines the control value based on the refrigerant pressure and the memorized suction pressure of the stable state at the initial driving time of the compressor.

8. The air conditioning system according to claim 7, wherein
the storage unit is constructed of the control unit.

9. The air conditioning system according to claim 1, wherein
the compressor provided with the control value which is adjustable by the control unit is constructed of a variable capacity type compressor having a variable capacity.

10. The air conditioning system according to claim 1, wherein
the control unit determines the control value based on the pressure of the refrigerant at the initial driving time only in a case an outside-air temperature outside the passenger compartment is smaller than or equal to a predetermined value.

11. The air conditioning system according to claim 1, wherein
the control unit increases, at the initial driving time of the compressor, the control value as the pressure of the refrigerant increases irrespective of the difference between the target air temperature and the actual air temperature at the downstream side of the evaporator.

12. The air conditioning system according to claim 11, wherein
the control unit increases, at the initial driving time, the control value as an outside-air temperature outside the passenger compartment increases.

13. The air conditioning system according to claim 1, wherein the control unit determines the control value independently of the difference in the target air temperature and the actual air temperature when the compressor is determined to be in the initial driving time.

14. An air conditioning system for a vehicle, comprising: a refrigerant cycle device which has an evaporator and a compressor and in which refrigerant is discharged from the compressor to be evaporated in the evaporator so that air passing through the evaporator is cooled to be blown into a passenger compartment of the vehicle; and a control unit which calculates a control value for determining a driving output of the compressor to control an operation of the compressor, wherein the control unit determines whether the compressor is in an initial driving time only after power has initially been supplied to the control unit and the compressor has not been actuated after the power has initially been supplied to the control unit; the control unit determines the control value based on an outside-air temperature outside the passenger compartment, only when the compressor is determined to be in the initial driving time after the power has initially been supplied to the control unit and wherein the control unit drives the compressor by the determined control value when the control unit actuates the compressor after the initial driving time after the power has initially been supplied to the control unit; and the control unit determines the control value based on a difference between a target air temperature and an actual air temperature at a downstream side of the evaporator, when the control unit has actuated the compressor after the initial driving time and the power is still being supplied to the control unit.

15. The air conditioning system according to claim 14, wherein
the control unit determines the control value in response to a current mode which is one of an inside air mode where air inside the passenger compartment is taken in and an outside air mode where air outside the passenger compartment is taken in at the initial driving time of the compressor.

16. The air conditioning system according to claim 14, wherein
the control unit performs a control for determining the control value in the case where the outside-air temperature is smaller than or equal to a predetermined value at the initial driving time of the compressor.

17. The air conditioning system according to claim 14, wherein
the compressor provided with the control value which is adjustable by the control unit is constructed of a variable capacity type compressor having a variable capacity.

18. The air conditioning system according to claim 14, wherein the control unit determines the control value independently of the difference in the target air temperature and the actual air temperature when the compressor is determined to be in the initial driving time.

19. An air conditioning system for a vehicle, comprising: a refrigerant cycle device which has an evaporator and a compressor and in which refrigerant is discharged from the compressor to be evaporated in the evaporator so that air passing through the evaporator is cooled to be blown into a passenger compartment of the vehicle; and a control unit which calculates a control value for determining a driving output of the compressor to control an operation of the compressor, wherein the control unit determines whether the compressor is in an initial driving time only after power has initially been supplied to the control unit and the compressor has not been actuated after the power has initially been supplied to the control unit under a predetermined condition for setting the driving output of the compressor; the control unit determines the control value based on at least one of a pressure of refrigerant in the refrigerant cycle device and an outside-air temperature outside the passenger compartment, only when the predetermined condition for setting the driving output of the compressor is determined and the compressor is determined to be in the initial driving time after the power has initially been supplied to the control unit, and the control unit determines the control value as a function of an air temperature at a downstream side of the evaporator, when the control unit has actuated the compressor after the initial driving time and the power is still being supplied to the control unit.

20. The air conditioning system according to claim 19, wherein
the predetermined condition is that a predetermined period of time has elapsed since the control unit starts the control for determining the control value to actuate the compressor.

21. The air conditioning system according to claim 19, wherein
the predetermined condition is that a temperature of the evaporator is smaller than or equal to a predetermined value after the control unit starts the control for determining the control value to actuate the compressor.

22. The air conditioning system according to claim 19, wherein
the compressor provided with the control value which is adjustable by the control unit is constructed of a variable capacity type compressor having a variable capacity.

23. The air conditioning system according to claim 19, wherein the control unit determines the control value independently of the difference in the target air temperature and the actual air temperature when the compressor is determined to be in the initial driving time.

* * * * *